United States Patent [19]

Klar et al.

[11] Patent Number: 4,613,392

[45] Date of Patent: Sep. 23, 1986

[54] APPARATUS AND METHOD FOR ASSEMBLING A FLEXIBLE RECORDING DISC

[75] Inventors: Robert H. Klar, Hollis; Jeffery R. Lord, Wells, both of Me.

[73] Assignee: Shape Inc., Biddeford, Me.

[21] Appl. No.: 739,859

[22] Filed: May 31, 1985

[51] Int. Cl.⁴ .............................................. B31F 5/00
[52] U.S. Cl. .................................... 156/235; 29/428; 156/378; 156/541; 156/556
[58] Field of Search .................... 29/428, 700, 809; 156/261, 262; 413/9, 19; 156/556, 540-542, 230, 238, 235, 64, 364, 378

[56] References Cited

U.S. PATENT DOCUMENTS

| | | | |
|---|---|---|---|
| 2,501,465 | 3/1950 | Caramanoff | 274/42 |
| 3,051,496 | 8/1962 | Borgia | 274/42 |
| 3,360,271 | 12/1967 | George | 274/42 |
| 3,546,768 | 12/1970 | Acton et al. | 413/9 X |
| 3,639,188 | 2/1972 | Vogel | 156/231 |
| 3,709,755 | 1/1973 | Wochner | 156/235 |
| 3,904,718 | 9/1975 | Kuehn | 156/540 X |
| 4,052,750 | 10/1977 | Barber et al. | 360/135 |
| 4,177,548 | 12/1979 | Yarick et al. | 29/809 X |
| 4,370,689 | 1/1983 | Davies | 360/135 |
| 4,445,157 | 4/1984 | Takahashi | 360/133 |
| 4,453,246 | 6/1984 | Covington | 369/284 |
| 4,480,282 | 10/1984 | Brock et al. | 360/135 |
| 4,510,546 | 4/1985 | Asami et al. | 360/133 |

*Primary Examiner*—David Simmons
*Attorney, Agent, or Firm*—Staas & Halsey

[57] ABSTRACT

An automated apparatus and method for assembling a flexible recording disc, including a single A-ring assembly station having an A-ring pick-up substation and a disc/A-ring assembly substation. The apparatus includes a tractor roller for indexing an A-ring carrier tape having a plurality of A-rings thereon past a predetermined position at the A-ring pick-up substation; optical sensors for sensing the position of each of the plurality of A-rings relative to the predetermined position; an air cylinder operated device and hub carrier and placement tool for stripping and applying a first of the plurality of A-rings to a first hub carried on the hub carrier and placement tool; an A-ring assembly substation with a spring-loaded plunger for receiving a flexible recording disc; an automatically controlled mechanical device, such as a robot, for moving the hub carrier and placement tool with the first hub/A-ring components to the flexible recording disc and adhering the first hub/A-ring to the flexible recording disc; and a proximity switch for signalling the completion of the stripping and application of the first of the plurality of A-rings to the first hub. The method includes the steps of: indexing each of the plurality of A-rings to a predetermined position; sensing the position of the plurality of A-rings relative to the predetermined position during indexing; stripping and applying the first of the plurality of A-rings to a first hub carried by the hub carrier and placement tool; positioning a flexible recording disc on an A-ring assembly substation; signalling the completion of the stripping and application of the first of the plurality of A-rings to the first hub; moving the hub carrier and placement tool with the first hub/A-ring thereon to the flexible recording disc on the A-ring assembly substation; and adhering the first hub/A-ring from the hub carrier and placement tool onto the flexible recording disc.

15 Claims, 6 Drawing Figures

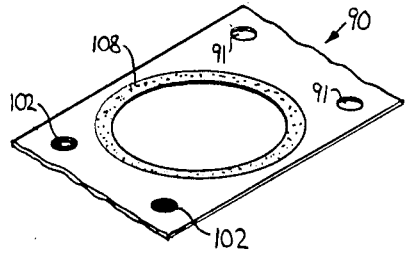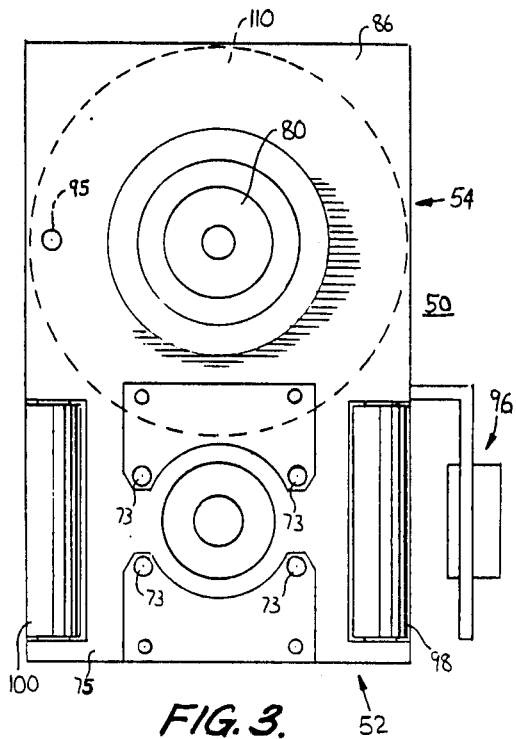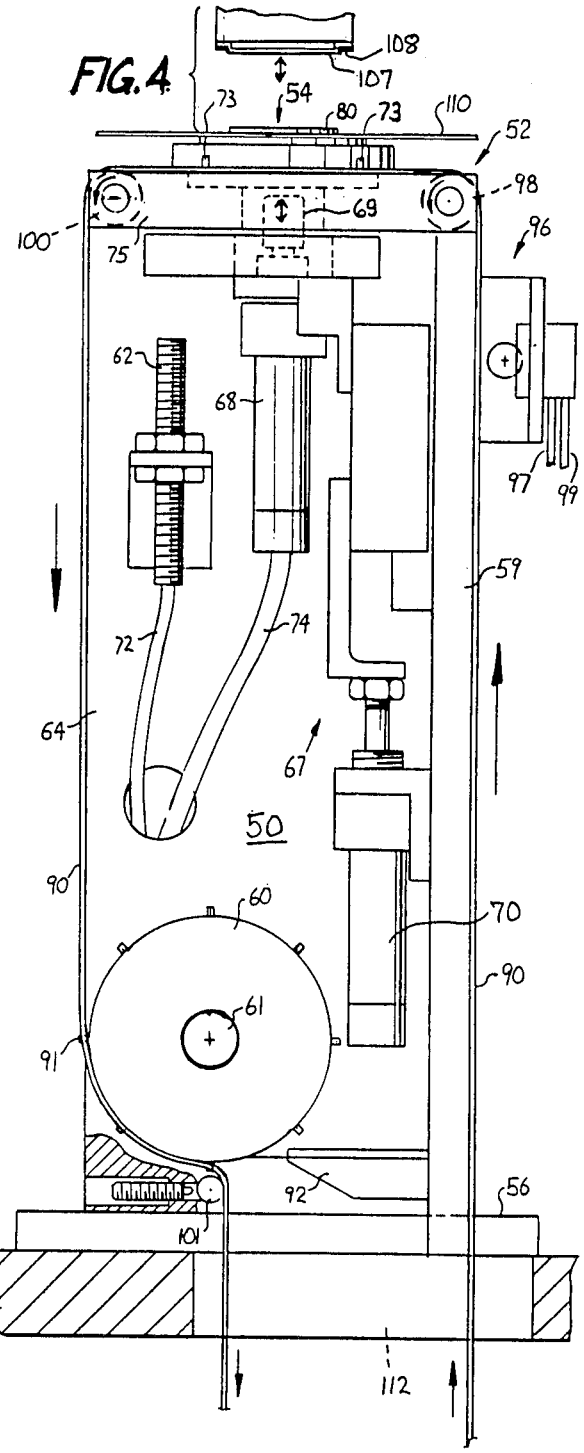

APPARATUS AND METHOD FOR ASSEMBLING A FLEXIBLE RECORDING DISC

BACKGROUND OF THE INVENTION

This invention relates to producing a flexible recording disc and, more particularly, to an apparatus and method for assembling an adhesive "A-ring" between the flexible recording disc and the circular metal hub attached at the center thereof.

Referring to FIG. 1 herein, there is shown an exploded view of a conventional flexible recording disc cassette indicated generally by reference numeral 10. The cassette 10 includes a flexible recording disc 12 consisting of a thin, polymeric film base with a magnetic layer formed thereon. The flexible recording disc 12 includes a circular metal hub 14 having a flange 20. The flange 20 is fastened to a circular aperture 18 formed centrally in the flexible magnetic disc 12 by means of a ring-like, double-sided adhesive member 16, known as an "A-ring". In addition, a generally square-shaped, motor shaft insertion aperture 22 and a rectangular, positioning pin insertion aperture 24 are formed in a central portion of the hub 14.

Further, the flexible magnetic disc 12, having the hub 14 adhered thereto, is contained in a cassette comprising a cover 26, a base 28, and fabric liners 30 and 32. Finally, a flexible wiper spring 34 made of synthetic resin is interposed between the base 28 and the fabric liner 32 for pressing the liner 32 firmly against the magnetic surface of the magnetic disc 12.

Conventionally, the assembly of and the method used to assemble the flexible recording disc 12 shown in FIG. 1 include the following. At a first assembly station the adhesive A-ring 16 is manually removed from a backing and is applied to the flange 20 of the hub 14 located on a conventional hub placement tool (not shown). Then, the hub placement tool is moved to à second, remote assembly station where the hub is inserted into the flexible recording disc 12 so that the flange 20 adheres to the circular aperture 18.

Of course, such a manual apparatus and method is time consuming, is susceptible to human error and has a high rejection rate. Accordingly, the prior art discussed above still does not teach an apparatus and method for assembling a flexible recording disc which are capable of the most cost and time efficient automated assembly.

SUMMARY OF THE INVENTION

Accordingly, it is an object of the present invention to automate the overall handling and assembly of the A-ring to the hub and disc.

It is another object of the present invention to minimize the travelling distance of the hub placement tool between stations.

It is another object of the present invention to provide an apparatus and method for assembling a flexible recording disc which is capable of facilitated handling of an A-ring carrier, including easy, fast and accurate feeding and positioning of the carrier into the A-ring assembly station.

It is another object of the present invention to provide an apparatus and method for assembling a flexible recording disc which is characterized by easy cleaning of the component parts thereof without the need for elaborate tools.

Finally, it is an object of the present invention to provide an apparatus and method for assembling a flexible recording disc with the highest degree of accuracy and repeatability and which is capable of utilizing different types of A-ring carriers.

To achieve the foregoing and other objects of the present invention and in accordance with the purposes of the invention there is provided an apparatus and assembly for assembling a flexible recording disc with improved cost and time efficiency.

The apparatus generally includes a single A-ring assembly station having an A-ring pick-up situation and an A-ring/disc assembly substation. More particularly, an A-ring carrier tape comprising numerous A-rings is threaded over the top plate of the A-ring pick-up substation and is indexed by a powered tractor roller. Each A-ring is accurately located thereat by four tapered pins positoned on a plate. That is, the pins are driven up through tractor holes in the A-ring carrier tape. The approximate location of each A-ring is detected by two bifurcated optics. The first optic is used to stop rotation of the tractor roller and the second optic is used to detect the presence of "indicators," if any, formed on the A-ring carrier tape. Each indicator signals the machine if there is an A-ring missing and then causes the machine to double index to compensate therefore. A proximity switch is also built into the A-ring pick-up station adjacent the A-ring carrier tape path of travel to alert the machine controller that the station has completed its cycle and is prepared to index again. A hub is initially picked up from a hub supply means and magnetically held on a moveable hub placement tool. The precise seating of the hub on the head of the moveable hub carrier and placement tool is further aided by an extending cap actuated by an air cylinder mounted below the A-ring pick-up station just before the hub reaches the A-ring on the A-ring carrier tape. This air cylinder also aids in "stripping" the A-ring from the backing of the A-ring carrier tape by applying pressure to the hub against the head of the moveable hub carrier and placement tool while the hub placement tool lifts the hub upwardly away from the A-ring carrier tape. An A-ring/disc assembly substation is provided and includes a disc nest and a spring biased tapered plunger which precisely positions a flexible recording disc on the nest before the hub/A-ring is bonded thereto. A further optic sensor detects the presence of the flexible recording disc on the assembly nest before the hub placement tool leaves the A-ring pick-up substation. Finally, the hub, with the A-ring attached thereto, is moved by the hub placement tool to the flexible recording disc located on the assembly nest where the hub precisely is attached to the flexible recording disc by the hub placement tool.

The method includes the following steps: providing an A-ring carrier tape including a plurality of adhesive A-rings; indexing each of the plurality of A-rings to a predetermined position; sensing the position of the plurality of A-rings relative to the predetermined position; providing means for stripping and applying the first of the plurality of A-rings to a first hub received by a hub placement tool; signalling the completion of the stripping and application of the first of the plurality of A-rings to the first hub; moving the hub placement tool to a means for receiving a flexible recording disc; and adhering the first hub to the flexible recording disc via the first A-ring.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a top view of the apparatus for assembling a flexible magnetic disc according to the present invention;

FIG. 4 is a right side view of the apparatus for assembling a flexible magnetic disc according to the present invention;

FIG. 5 is a perspective view of an example of the A-ring carrier tape used with the present invention.

DETAILED DESCRIPTION OF THE PREFERRED EMBODIMENTS

Figure 1:
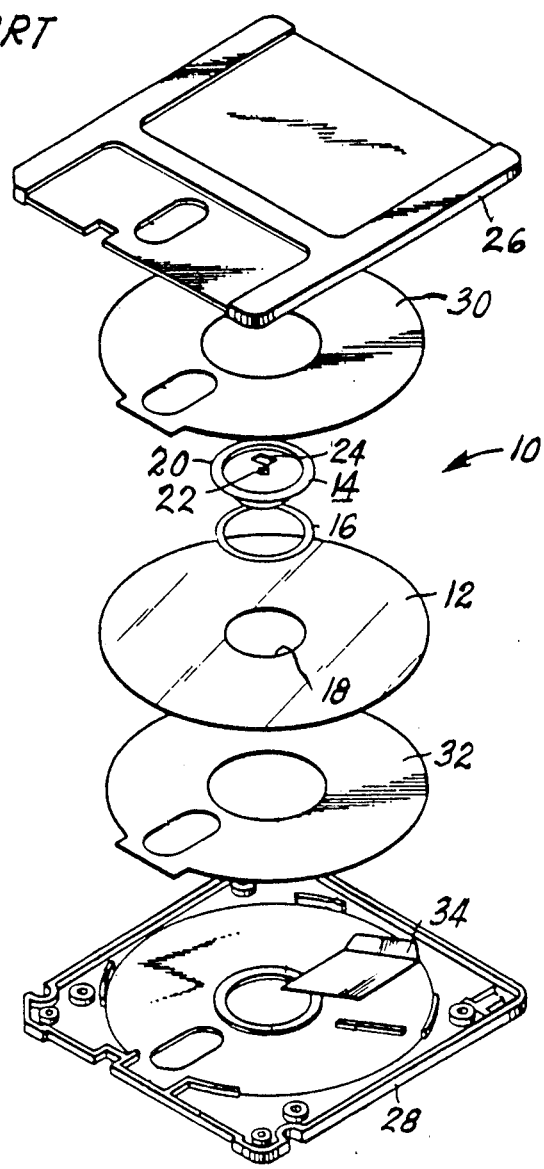
FIG. 1 is an exploded perspective view of a conventional flexible recording disc cassette, illustrating particularly the position of the A-ring between the hub and the flexible recording disc.
Figure 2:
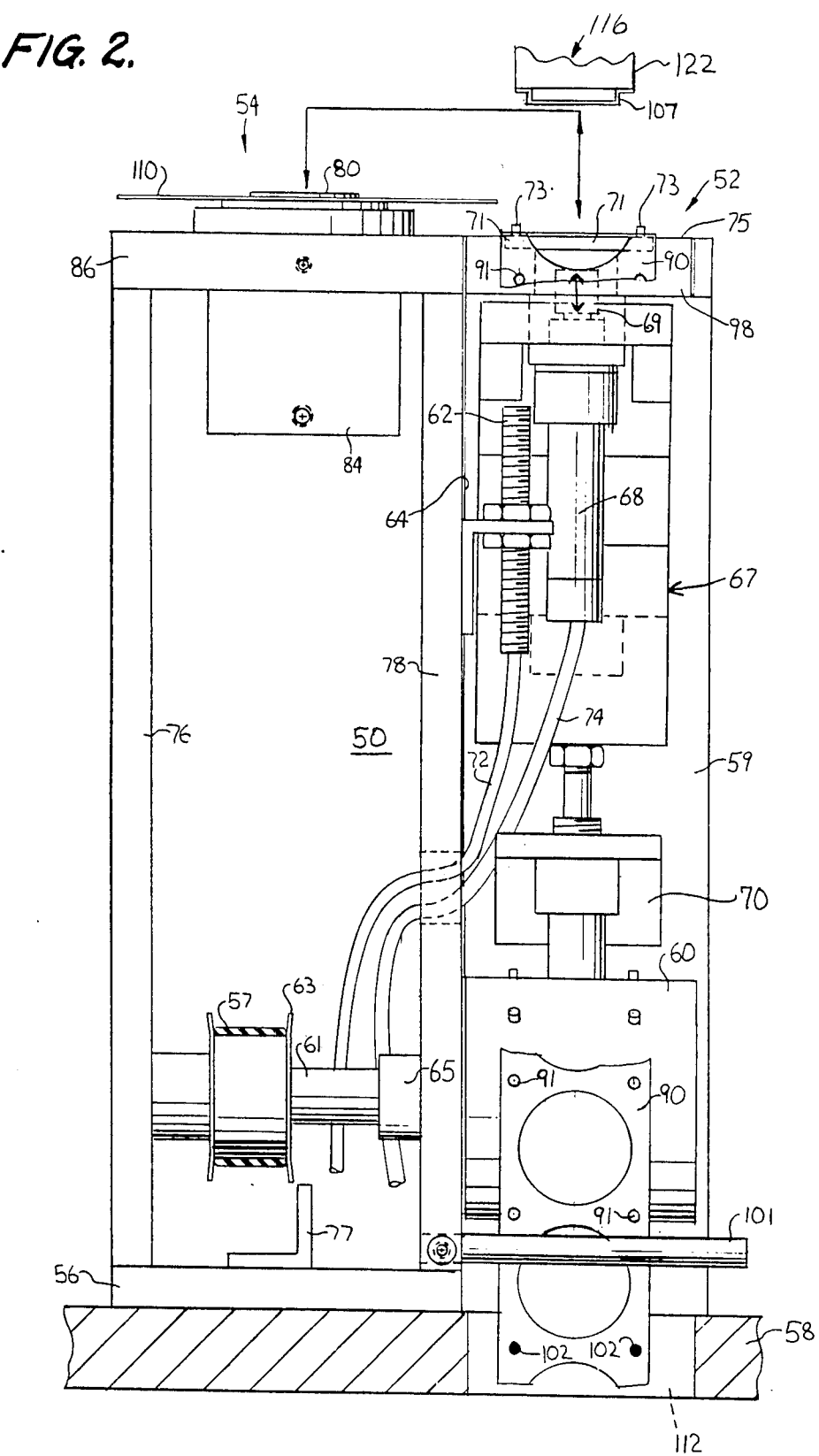
FIG. 2 is a front view of the apparatus for assembling a flexible recording disc according to the present invention.

As can be seen in FIGS. 2-4, the A-ring assembling station indicated by reference numeral 50, generally includes an A-ring pick-up substation 52 and a flexible disc/A-ring assembly substation 54.

More particularly, the A-ring assembly station 50 includes a base plate 56 positioned on, e.g., a table top 58. The A-ring pick-up station 52 is supported on the base plate 56 via a back plate 59 and a side plate 64. The disc/A-ring assembly substation 54 is supported on the base plate 56 via first and second supports 76 and 78.

As best seen in FIGS. 2 and 4, the A-ring assembly station 50 comprises means for indexing an A-ring carrier tape 90 (FIG. 5), including a tractor roller 60 rotatably mounted via supports 76 and 78. That is, connected to the tractor roller 60 is a roller shaft 61, a pulley 63 connected via a belt 57 to a drive motor (not shown), and a set screw collar 65. In addition, an air line guard 77 is mounted on the base plate 56 adjacent the pulley 63 to prevent contact between the belt and the air lines 72 and 74, to be described hereafter.

Figure 6:
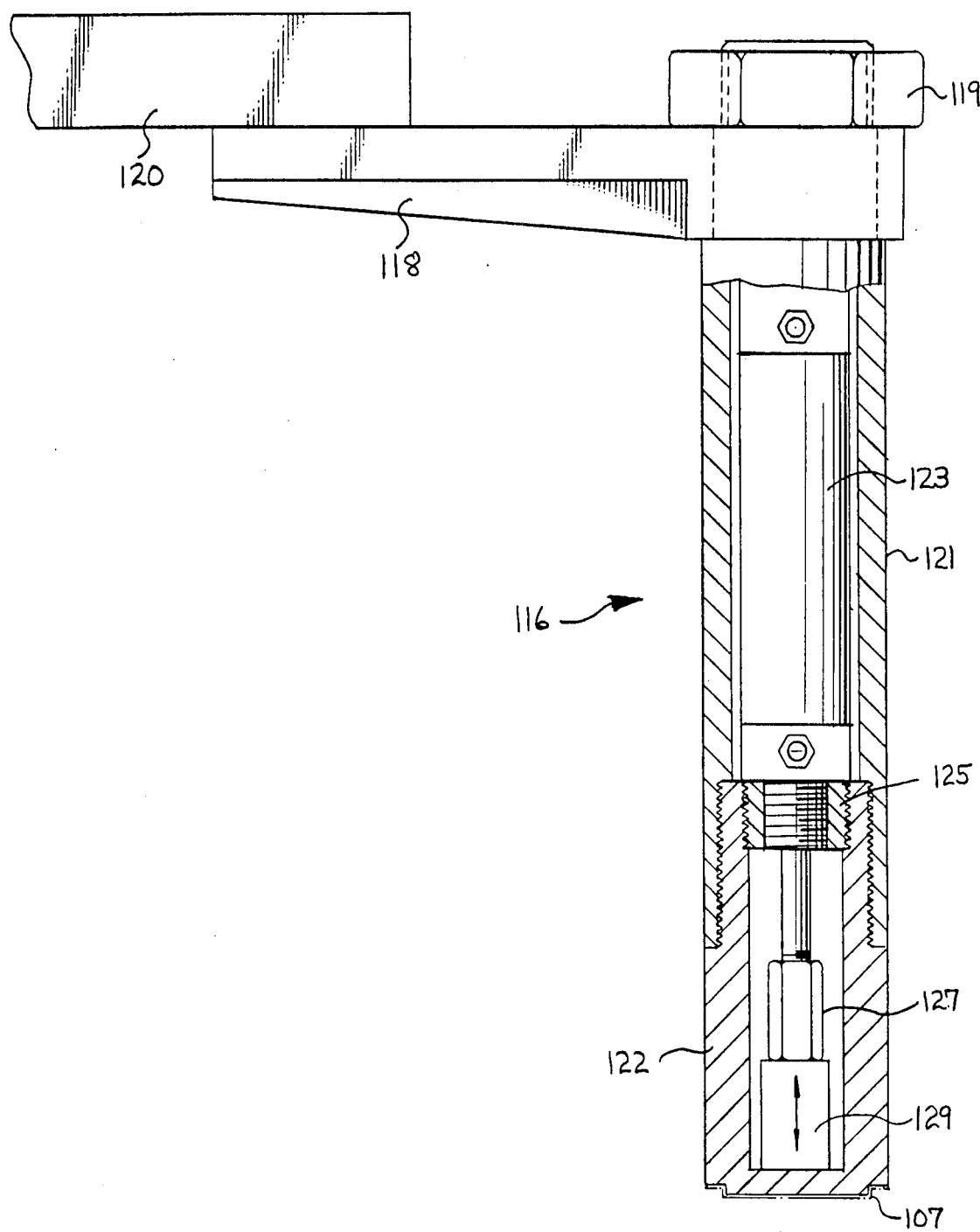
FIG. 6 is a partial cross-sectional side view of the robot arm and hub carrier and placement tool used with the present invention.

The A-ring assembly station 50, also comprises means for aiding the stripping of each A-ring 108 from the A-ring carrier tape 90 (FIG. 5) and applying it to a hub 107 which is located on a hub carrier and placement tool 116 (FIGS. 2 and 6). That is, an air cylinder 68 is mounted on the side plate 64 below the A-ring pick-up substation 52. The air cylinder 68 has an end cap 69 which is moveable upwardly from the substation 52 to engage the hub 107 positioned on the hub placement tool 116. A lift plate 71, including four tapered locating pins 73, is also moveably mounted and operatively connected to another air cylinder 70 near the top plate 75 of the A-ring pick-up substation 52. The air cylinder 70 is connected to a ball slide 67 mounted to the back plate 59. Extending through the table top 58, the base plate 56 and the side plate 64 are a pair of air lines 72 and 74 which, respectively, are attached to a proximity switch 62 that in turn is mounted to the side plate 64 and the air cylinder 68. The proximity switch 62 determines whether the A-ring pick-up substation 52 cycle has been completed.

The disc/A-ring assembly substation 54 includes means for supportingly receiving a flexible recording disc 110. More particularly, there is a movable, plunger 80 spring mounted to a plunger block 84. These members 80 and 84 are connected to an assembly nest mount 86. The plunger 80 of the assembly substation 54 is spring-mounted to precisely position the flexible recording disc 110 for proper bonding to the hub/A-ring that is to be supplied by the hub carrier and placement tool 116. This plunger 80 also ensures that the hub 107 is properly seated on the hub carrier and placement tool 116 before the A-ring 108 on the hub 107 is adhered to the recording disc 110. An optic sensor 95 is provided at the assembly substation 54 to detect the presence or absence of a disc 110 thereat before the hub carrier and placement tool 116 moves the hub/A-ring components thereto from the A-ring pick-up substation 52.

The A-ring carrier tape 90, which includes a plurality of A-rings 108 and numerous sets of tractor holes 91, extends around the perimeter of the A-ring pick-up substation 52. More particularly and as best seen in FIGS. 3 and 4, the A-ring carrier tape 90 is threaded through an opening 112 in the table top 58. The A-ring carrier tape 90 then runs along the back plate 59 and past the fiber optic mount 96. At the top plate 75 of the A-ring pick-up station 52, the A-ring carrier tape 90 moves across a first tape roller 98, across the actual A-ring pick-up area on the top plate 75 where each A-ring 108 is stripped from the tape; across a second tape roller 100, down the front of the A-ring pick-up station 52 and along the tractor roller 60. At the bottom of the A-ring pick-up station 52, there is attached a doctor blade 92 which abuts the tractor roller 60. Finally, the A-ring carrier tape 90 moves past a spring biased shaft 101 and the remnants thereof are passed through the opening 112 in the table top 58 and are discarded.

The A-ring assembly station 50 also includes means for sensing the location of the plurality of A-rings 108 relative to the A-ring pick-up substation 52, i.e., the bifurcated optics 97 and 99. The bifurcated optics 97 and 99 are attached to the back plate 59 via a fiber optic mount 96. The second optic 99 is used to detect the presence of the indicators 102 formed in the A-ring carrier tape 90. Each indicator 102, e.g., foil covering a tractor hole 91, signals the machine intelligence center (not shown) via the optic 99 if there is an A-ring 108 missing and thus causes the assembly station 50 to double index to compensate therefore.

The A-ring assembly station 50 also comprises means for signalling the completion of the stripping and application of an A-ring 108 from the carrier tape 90 to a hub carrier and 107 on the hub placement tool 116. That is, the proximity switch 62 is used to alert the assembly station 50 controller that the A-ring pick-up substation 52 has completed its cycle and is prepared to index the carrier tape 90 again so that another A-ring 108 can be removed.

The apparatus in accordance with the invention also comprises means for precisely locating and assembling hub 107 to an A-ring 108, and then moving the assembled hub/A-ring components and locating and assembling the hub/A-ring to a flexible recording disc 110 on the disc/A-ring assembly substation 54. As embodied herein and as shown in FIG. 6, the hub locating and assembling means comprises a hub carrier and placement tool 116 including an adaptor bracket 118 attachable to a conventional robot arm or mechanical pick-up and place mechanism 120, a pick-up head mounting fixture 121, a fixture clamping nut 119 for connecting a threaded end of the mounting fixture 121 to the adaptor bracket 118, and a precision hub pick-up head 122 at the other end of the mounting fixture 121. An air cylinder 123 is mounted internally in the pick-up head mounting fixture 121 by cylinder mount 125. A cylinder connector 127 connects the cylinder 123 to a magnet 129 such that the magnet 129 is moveable in and out of the hub pick-up head 122 as shown by the double arrow.

FIGS. 2-4 and 6 also illustrate the method for assembling the hub 107 and A-ring 108 and the hub/A-ring components to the flexible recording disc 110 according to the present invention. More particularly, a supply of A-ring carrier tape 90 is provided on a rotatable reel (not shown) under the table top 58. The A-ring carrier tape 90 is then threaded up through the opening 112 in the table top 58, extended over the top plate 75 and across the powered tractor roller 60 which indexes the A-ring carrier tape 90. The four locating pins 73 formed on the lift plate 71 are then driven up by the air cylinder 70 through the set of four tractor holes 91 formed in the A-ring carrier tape 90. The pins 73 are operatively connected to ball slide 69 to provide a repeatable tolerance.

The approximate location of each A-ring 108 on tape 90 is detected by the two bifurcated optics 97 and 99. The first optic 97 is used to stop the drive motor (not shown) connected to the indexing tractor roller 60 and the second optic 99 is used to detect the presence of the indicators 102 formed in the A-ring carrier tape 90. As stated above, each indicator 102 signals the machine intelligence center (not shown) via the optic 99 if there is an A-ring missing and causes the A-ring assembly station 50 to double index to compensate therefor.

As best shown in FIG. 6, the positioning and assembly of the hub to the A-ring and the hub/A-ring components to the recording disc is achieved by the hub placement tool 116. A conventional high-precision scara-type robot or another conventional mechanical pick-up and place mechanism is used as a programmable carrying system for the precise positioning and assembly of the hub 107 to an A-ring 108 located at the A-ring pick-up substation 52 and of the assembled hub/A-ring components to the recording disc 110 at the disc/A-ring assembly substation 54. More particularly, the robot positions the hub pick-up head 122 onto a hub 107 which has been automatically fed to a hub supply nest (not shown). When the hub 107 is in position, the air cylinder 123 located internally in the pick-up head mounting fixture 121 propels the magnet 129 downward inside the hub pick-up head 122 to magnetically hold the hub 107 to the end contours of the pick-up head 122. The hub carrier and placemennt tool 116 then moves the hub 107 to the A-ring pick-up substation 52 and presses the hub 107 onto the A-ring 108. Prior to the hub 107 being pressed against the A-ring 108, the end cap 69 operatively connected to the air cylinder 68 is moved upwardly to engage hub 107 and aid in the precise seating of the hub 107 on the hub pick-up head 122 of the hub carrier and placement tool 116. After the end cap 69 engages the hub 107 to properly seat the hub 107 on the hub pick-up head 122, the hub 107 comes into contact with the A-ring 108 at the A-ring pick-up substation 52. After the hub 107 is pressed onto the A-ring 108, the hub 107 with the adhered A-ring 108 is lifted upwardly by the hub carrier and placement tool 116.

The air cylinder 68 aids in "stripping" the A-ring 108 pressed into adhesive contact with the hub 107 on the hub carrier and placement tool 116 from the backing of the A-ring carrier tape 90 by applying pressure to the hub 107 while the hub carrier and placement tool 116 lifts the hub 107 away from the substation 52.

The hub 107 with the A-ring 108 attached thereto, is then physically moved to the flexible recording disc 110 located at the disc/A-ring assembly substation 54 using the hub carrier and placement tool 116. The hub/A-ring is accurately moved into location over the disc 110 by the automatically controlled robot or mechanical pick and place mechanism.

The proximity switch 62 alerts the machine controller that the A-ring pick-up station 52 has completed its cycle, and that the assembled hub/A-ring components have left the substation 52 and thus is prepared to index the carrier tape 90 again so that another A-ring 108 can be moved to substation 52.

Upon indexing, the remnant of the A-ring carrier tape 90 is then pulled down the front of the A-ring assembly station 50 by the indexing tractor roll 60 past the shaft 101 and down through the table top 58 as scrap with the aid of the doctor blade 92.

In light of the above description, the benefits of this invention over the prior art include: automation of the A-ring assembly process; minimization of hub placement tool travelling distance; facilitation of the A-ring feeding and loading operation and the overall operation of the A-ring assembly; easy removal of component parts for cleaning without the use of special tools; and the capability of accepting several different types of A-ring carrier tapes with repeatability and accuracy.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

We claim:

1. A method for assembling a flexible recording disc, comprising the following steps;
    (a) providing an A-ring carrier tape including a plurality of adhesive A-rings;
    (b) indexing each of the plurality of A-rings to a predetermined position;
    (c) stripping the first of the plurality of A-rings from the A-ring carrier tape and applying the first of the plurality of A-rings to a first hub carried by a hub carrier and placement tool;
    (d) providing means for receiving a flexible recording disc;
    (e) moving the hub carrier and placement tool with the first hub/first A-ring attached thereto to the means for receiving the flexible recording disc; and
    (f) adhering the first hub to the flexible recording disc via the first A-ring fixed on the first hub.

2. The method as recited in claim 1, further comprising the steps of:
    (g) sensing the position of the plurality of A-rings during indexing relative to the predetermined position.

3. The method as recited in claim 2, wherein the sensing step comprises the substep of: sensing indicia on the carrier tape using optic means.

4. The method as recited in claim 1, wherein the steps (a)–(f) are automated.

5. The method as recited in claim 2, further comprising the substep of: sensing the position of the plurality of A-rings using optical means.

6. The method as recited in claim 5, further comprising the step of:
(h) signalling the completion of the stripping of the first A-ring from the A-ring carrier tape.

7. The method as recited in claim 6, wherein the signalling step comprises the substep of: signalling the completion of the stripping using a proximity switch.

8. An apparatus for assembling a flexible recording disc, comprising:
(a) an A-ring carrier tape including a plurality of adhesive A-rings;
(b) means for indexing each of the plurality of A-rings to a predetermined position;
(c) means for stripping and applying a first of the plurality of A-rings to a first hub received on a hub carrier and placement tool;
(d) means for receiving a flexible recording disc; and
(e) means for moving the hub carrier and placement tool to the flexible recording disc to adhere the first hub/first A-ring to the recording disc.

9. The apparatus as recited in claim 8, further comprising:
(f) means for sensing the position of each of the plurality of A-rings during indexing relative to the predetermined position.

10. The apparatus as recited in claim 8, wherein the indexing means, stripping and applying means, and the means for moving the hub are automatically controlled.

11. The apparatus as recited in claim 7, wherein the sensing means comprises optical means.

12. The apparatus as recited in claim 11, further comprising means for signalling the completion of the stripping of the first A-ring from the A-ring carrier tape.

13. The apparatus as recited in claim 12, wherein the signalling means comprises a proximity switch.

14. A method for assembling a flexible recording disc, comprising the following steps:
(a) providing an A-ring carrier tape including a plurality of adhesive A-rings;
(b) indexing each of the plurality of A-rings to an A-ring pick-up substation;
(c) stripping the first of the plurality of A-rings from the A-ring carrier tape and applying the first A-ring to a first hub carried by a hub carrier and placement tool;
(d) providing an A-ring assembly substation for receiving a flexible recording disc;
(e) moving the hub carrier and placement tool with the first hub/first A-ring attached thereto to the A-ring assembly substation;
(f) adhering the first hub to the flexible recording disc via the first A-ring fixed on the first hub;
(g) sensing the position of the plurality of A-rings during indexing relative to the A-ring pick-up substation; and
(h) signalling the completion of the stripping of the first of the plurality of A-rings from the A-ring carrier tape via sensing means.

15. An apparatus for assembling a flexible recording disc, comprising:
(a) an A-ring carrier tape including a plurality of adhesive A-rings;
(b) means for indexing each of the plurality of A-rings to an A-ring pick-up substation;
(c) means for stripping the first of the plurality of A-rings from the A-ring carrier tape and applying the first A-ring to a first hub carried by a hub carrier and placement tool;
(d) an A-ring assembly substation for receiving a flexible recording disc;
(e) means for moving the hub carrier and placement tool with the first hub/first A-ring attached thereto to the A-ring assembly substation;
(f) means for adhering the first hub to the flexible recording disc via the first A-ring fixed on the first hub;
(g) means for sensing the position of the plurality of A-rings during indexing relative to the A-ring pick-up station; and
(h) means for signalling the completion of the stripping of the first of the plurality of A-rings from the A-ring carrier tape via sensing means.

* * * * *